(12) United States Patent
Grady et al.

(10) Patent No.: US 8,685,194 B2
(45) Date of Patent: Apr. 1, 2014

(54) LAMINATED TOUCH FASTENERS

(75) Inventors: James T. Grady, Chester, NH (US);
Peter Iannazzi, Hampstead, NH (US);
Thomas O Brien, New Boston, NH (US); Clinton Dowd, Goffstown, NH (US); Andrew Collins, Bedford, NH (US)

(73) Assignee: Velcro Industries B.V., Willemstad, Curacao ( * ) Notice: Subject to any disclaimer, the term of this patent is extended or adjusted under 35 U.S.C. 154(b) by 196 days.

(21) Appl. No.: 13/236,415

(22) Filed: Sep. 19, 2011

(65) Prior Publication Data

US 2013/0067701 A1    Mar. 21, 2013

(51) Int. Cl.
| | |
|---|---|
| B05D 3/00 | (2006.01) |
| B32B 38/00 | (2006.01) |
| G01J 3/00 | (2006.01) |
| B05D 3/12 | (2006.01) |
| B32B 37/00 | (2006.01) |

(52) U.S. Cl.
USPC .......... 156/242; 156/280; 427/358; 427/299; 427/256; 356/51

(58) Field of Classification Search
USPC ........................................................ 156/242
See application file for complete search history.

(56) References Cited

U.S. PATENT DOCUMENTS

| 5,041,260 | A | | 8/1991 | Johnson et al. |
| 5,260,015 | A | | 11/1993 | Kennedy et al. |
| 5,669,120 | A | * | 9/1997 | Wessels et al. ................. 24/446 |
| 6,202,260 | B1 | | 3/2001 | Clune et al. |
| 6,248,276 | B1 | | 6/2001 | Parellada et al. |
| 6,540,863 | B2 | | 4/2003 | Kenney et al. |
| 6,692,674 | B1 | | 2/2004 | Kurtz et al. |
| 7,048,818 | B2 | | 5/2006 | Krantz et al. |
| 7,056,462 | B2 | | 6/2006 | Provost et al. |
| 7,172,008 | B2 | * | 2/2007 | Vanbenschoten et al. ..... 156/544 |
| 7,303,711 | B2 | | 12/2007 | Gallant et al. |

(Continued)

FOREIGN PATENT DOCUMENTS

| EP | 1444079 B1 | 6/2010 |
| WO | WO0027721 A9 | 11/2000 |
| WO | WO2009108919 A2 | 9/2009 |

OTHER PUBLICATIONS

International Search Report for International Application No. PCT/US2012/054828 mailed Dec. 14, 2012 (11 pages).

(Continued)

*Primary Examiner* — Philip Tucker
*Assistant Examiner* — Vicki Wu
(74) *Attorney, Agent, or Firm* — Fish & Richardson P.C.

(57) ABSTRACT

A method of making a laminated touch fastener includes introducing a flexible substrate to a resin applicator, applying flowable resin to a limited region of a surface of the substrate, and molding the applied resin to form a plurality of defined structures extending from a layer of the applied resin. The substrate surface, as the substrate is introduced to the resin applicator, has a surface characteristic that varies across the surface. The surface includes both a first region and a second region adjacent the first region, the surface characteristic varying to a greater degree within the second region than within the first region. The flowable resin may be applied within the first region such that an edge of the resin layer is disposed within, and adjacent an exposed portion of, the first region of the substrate surface.

18 Claims, 9 Drawing Sheets

(56) References Cited

U.S. PATENT DOCUMENTS

| | | |
|---|---|---|
| 7,373,700 B2 | 5/2008 | Martin et al. |
| 7,438,847 B2 | 10/2008 | Clune et al. |
| 7,935,296 B2 | 5/2011 | Koele et al. |
| 2003/0087059 A1 | 5/2003 | Jackson et al. |
| 2005/0101930 A1 | 5/2005 | Tachauer et al. |
| 2005/0280175 A1 | 12/2005 | Tachauer et al. |
| 2007/0022602 A1 | 2/2007 | Kingsford et al. |
| 2007/0134465 A1 | 6/2007 | Vanbenschoten et al. |
| 2008/0007409 A1 | 1/2008 | Ferry et al. |
| 2008/0081147 A1 | 4/2008 | Lindsay et al. |
| 2009/0064469 A1 | 3/2009 | Dowd |

OTHER PUBLICATIONS

International Preliminary Report on Patentability for PCT/US2012/054828 mailed Sep. 11, 2013.

\* cited by examiner

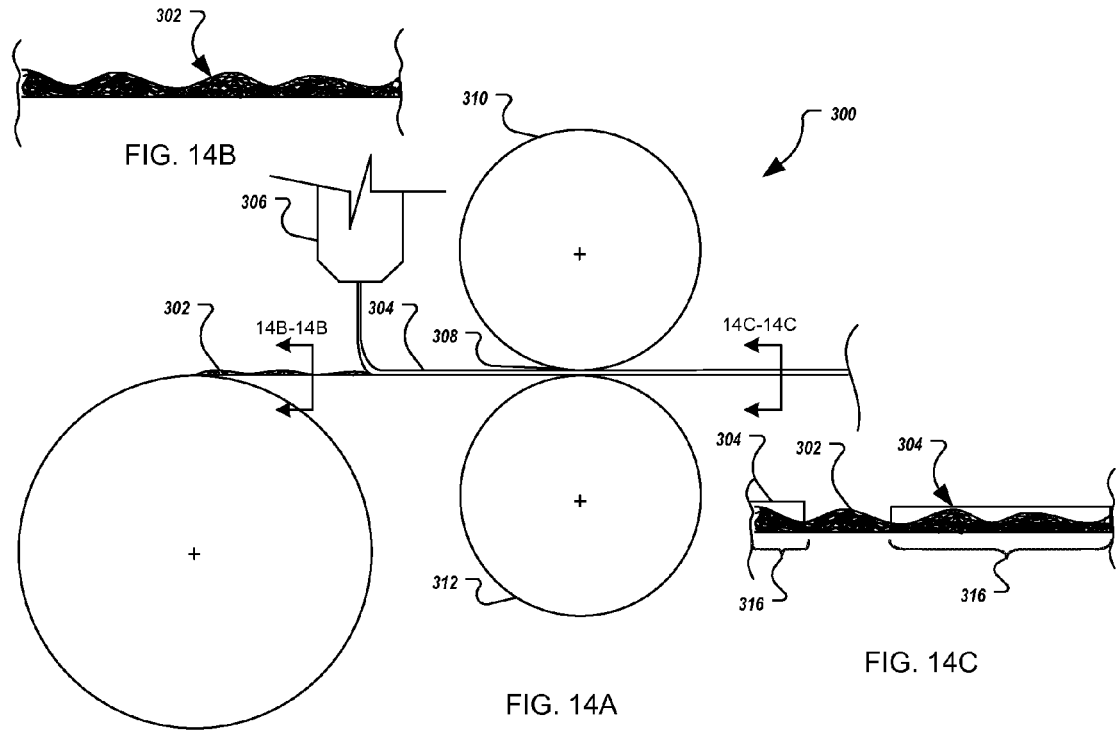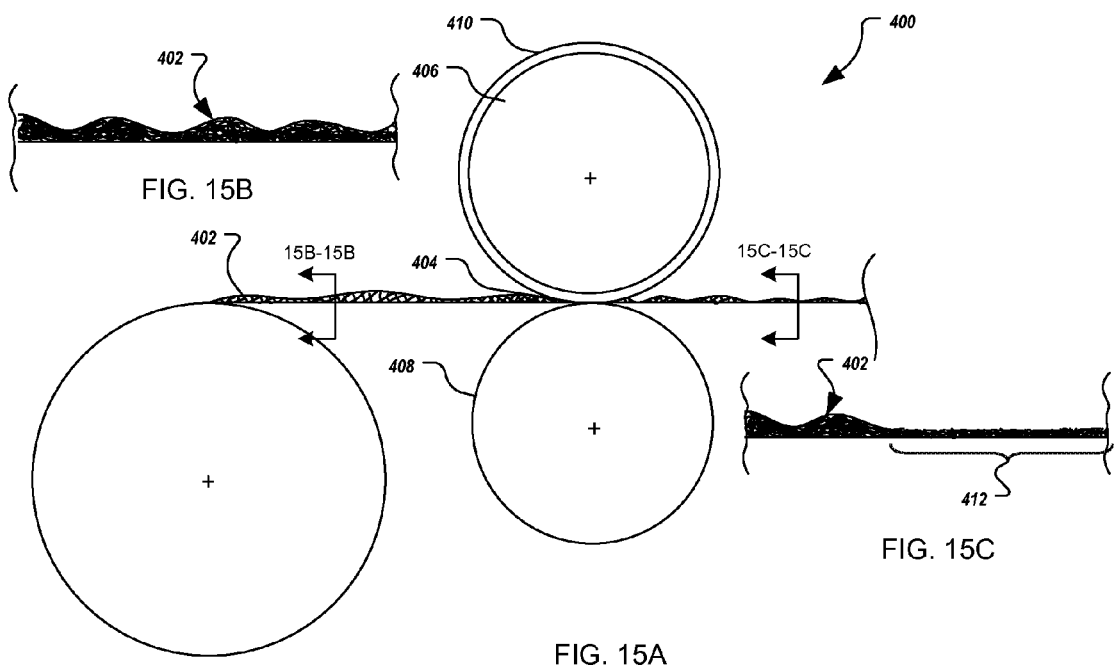

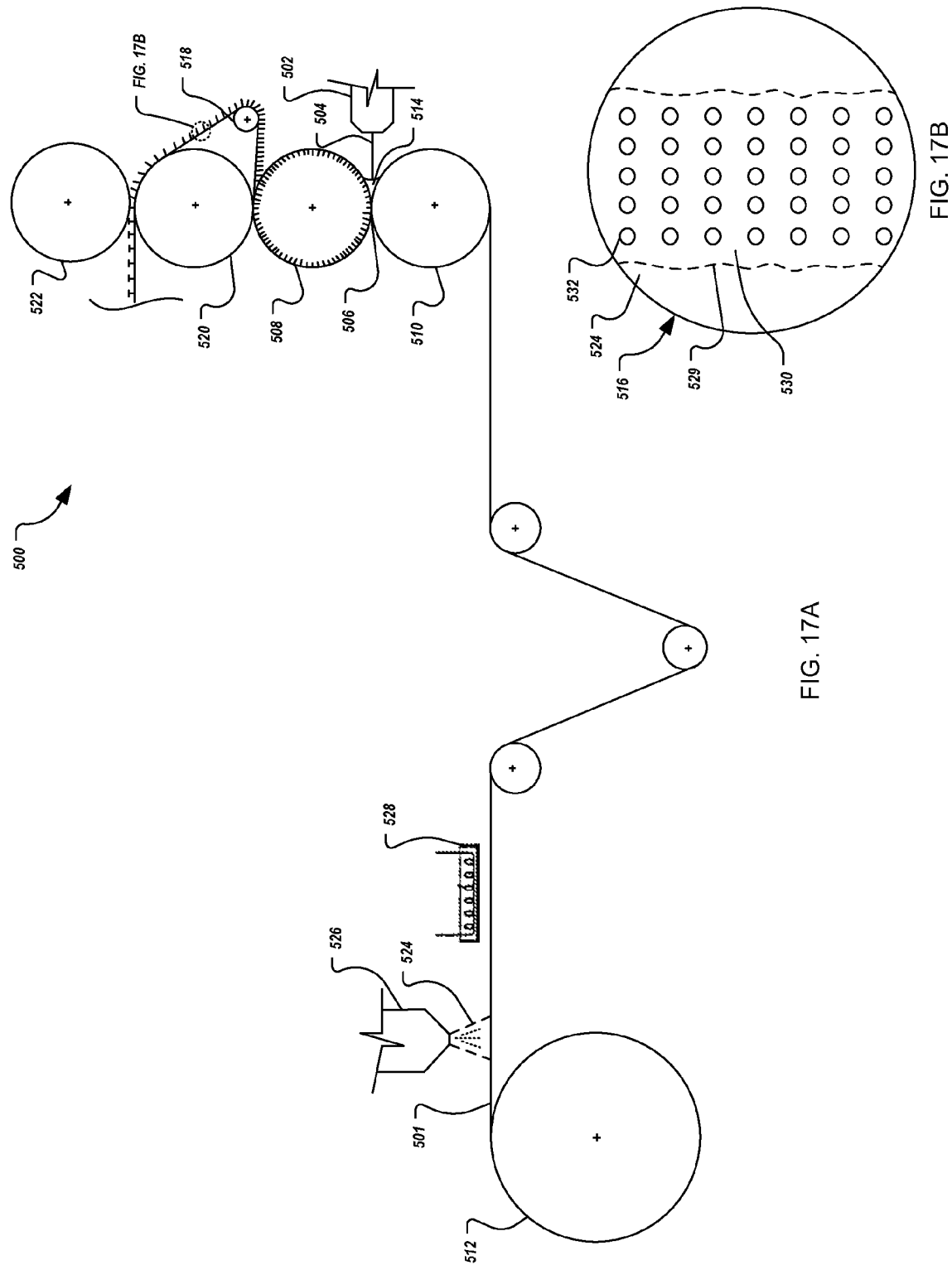

LAMINATED TOUCH FASTENERS

TECHNICAL FIELD

This invention relates to laminated touch fasteners and, more particularly, to systems and methods for their manufacture.

BACKGROUND

Mechanical touch fasteners are traditionally formed by weaving methods, or by molding discrete fastener elements on a substrate. When the fastener elements are molded from molten resin as the resin is laminated onto a limited region of a substrate surface, it can be difficult to produce a uniform resin edge. Often unsightly edge variations (e.g., splay) form when molten resin is applied to the substrate surface under pressure. Besides being visually objectionable, an edge having relatively severe splay can have an undesired tactile roughness.

SUMMARY

One aspect of the invention features a method of making a laminated touch fastener including: introducing a flexible substrate to a resin applicator, applying flowable resin to a limited region of a surface of the substrate, and molding the applied resin to form a plurality of defined structures extending from a layer of the applied resin, the substrate surface, as the substrate is introduced to the resin applicator, has a surface characteristic that varies across the surface, the surface including both a first region and a second region adjacent the first region, the surface characteristic varying to a greater degree within the second region than within the first region, and the flowable resin is applied within the first region, the resin is applied such that an edge of the resin layer is disposed within, and adjacent an exposed portion of, the first region of the substrate surface.

In some cases, the method includes prior to introducing the substrate to the resin applicator, modifying the substrate to form the first and second regions. In some examples, modifying the substrate includes modifying a portion of the substrate surface and leaving another adjacent portion of the surface substantially unmodified, the modified portion of the surface defining the first region and the unmodified portion of the surface defining the second region. In some embodiments, modifying the substrate surface includes reducing topographic surface variations. In some implementations, modifying the substrate surface includes substantially flattening three-dimensional features of the substrate surface.

In some applications, modifying the substrate surface includes applying pressure to the substrate. In some cases, applying pressure to the substrate includes introducing the substrate to a nip between calender rolls. In some examples, one of the calender rolls includes a knurled or embossed surface that contacts the substrate surface. In some embodiments, at least one of the calender rolls is heated. In some cases, applying pressure to the substrate includes introducing the substrate to a laminating press.

In some examples, modifying the substrate surface includes bonding a tie layer of material to the surface. In some embodiments, modifying the substrate surface includes texturing the surface. In some implementations, modifying the substrate surface includes: substantially flattening a first section of the surface, and texturing a second section of the surface.

In some cases, the method includes forming a plurality of slits in the resin layer to define discrete anti-peel flaps that are flexible out of a plane of the substrate. In some examples, forming a plurality of slits includes forming the slits in areas of the resin layer overlaying the substantially flattened first section of the substrate surface. In some applications, forming a plurality of slits includes forming the slits such that each slit extends from a point within an area of the resin layer overlaying the substantially flattened first section of the surface to a point proximate an area of the resin layer overlaying an edge of the textured second section of the surface. In some embodiments, forming a plurality of slits includes forming the slits such as to define interior anti-peel flaps. In some instances, forming a plurality of slits includes forming the slits such as to define edge anti-peel flaps.

In some examples, the method includes affixing the resin layer to the substrate surface within the limited region such that a first portion of the resin layer is more securely fixed to the substrate surface than a second adjacent portion of the resin layer. In some applications, the method still further includes forming a plurality of slits in the second portion of the resin layer, to form discrete flaps that are flexible outward from the substrate surface.

In some examples, modifying the substrate surface includes applying a layer of ink to the surface. In some implementations, the ink is pigmented. In some applications, the applied resin and the layer of ink are of a similar color, as compared to the substrate surface.

In some embodiments, the layer of ink reflects infrared radiation to a different degree than the substrate surface in a region adjacent the layer of ink, such that an edge of the layer of ink, as applied, is detectable by an infrared detection system.

In some examples, the surface characteristic can include any one of: porosity, surface height variability, permeability, density, fibrosity, reflectivity.

In some cases, the second region of the substrate surface, as the substrate is introduced to the resin applicator, is hook engageable. In some examples, the second region of the substrate surface, as the substrate is introduced to the resin applicator, includes topographic surface variations defining surface height variations of at least about 5 thousandths of an inch. In some implementations, the first region of the substrate surface, as the substrate is introduced to the resin applicator, includes topographic surface variations defining surface height variations of at most about 3 thousandths of an inch. In some application, the second region of the substrate surface, as the substrate is introduced to the resin applicator, includes a regularly patterned plurality of discrete three dimensional features.

In some cases, forming the plurality of structures includes forming a plurality of stems. In some applications, forming the plurality of structures also includes forming hooks, the outer surface of each of the hooks defining a crook for loop engagement.

In some implementations, the first region of the substrate surface, as the substrate is introduced to the resin applicator, is a substantially straight edged lane. In some cases, the lane is approximately 15mm wide. In some embodiments, the lane is continuous and extends along a length of the substrate. In some applications, the lane spans a width of the substrate.

In some embodiments, the first region of the substrate surface, as the substrate is introduced to the resin applicator, is a discrete zone substantially surrounded by the second region. In some cases, the discrete zone has a curved boundary.

Another aspect of the invention features a method of making a laminated touch fastener including: introducing a flexible substrate to a resin applicator, applying flowable resin to the first region of the substrate surface, and molding the applied resin to form an array of discrete structures each extending from a layer of the applied resin. The substrate surface, as the substrate is introduced to the resin applicator, defines an open channel and the substrate has an average basis weight within the channel that is essentially equal to an average basis weight of the substrate in a region adjacent the channel. The flowable resin is applied within the channel and bonds with the substrate in the channel, leaving a portion of the surface adjacent the channel exposed.

Yet another aspect of the invention features a method of making a laminated touch fastener including: modifying a surface of a flexible substrate to create a resin application region differing from other portions of the surface, introducing the flexible substrate with the resin application region to a resin applicator, applying flowable resin to the resin application region of the substrate surface, and molding resin applied to the first region of the substrate surface to form a plurality of defined structures extending from a layer of applied resin. The flowable resin is applied such that an edge of the resin layer bonds to the substrate surface in the resin application region.

Yet another aspect of the invention features a method making a laminated touch fastener including: introducing a flexible substrate to a resin applicator, applying flowable resin to a limited region of a surface of the substrate, and molding the applied resin to form an array of discrete structures extending from a layer of the applied resin. The substrate surface, as the substrate is introduced to the resin applicator, carries a surface-modifying substance defining a first surface region adjacent a second surface region void of the substance. The flowable resin is applied within the first surface region, leaving the second surface region exposed, and the resin is applied such that an edge of the resin layer is disposed within, and adjacent an exposed portion of, the first surface region.

In some cases, the surface-modifying substance inhibits transmission of infrared radiation to a different degree than the substrate surface in a region adjacent the surface-modifying substance, such that an edge of the surface-modifying substance is detectable by an infrared detection system. In some embodiments, the applied resin and the surface-modifying substance are of a similar color, as compared to the substrate surface. In some applications, the surface-modifying substance inhibits transmission of infrared radiation having a wavelength between about 600 nanometers and 1200 nanometers. In some examples, the surface-modifying substance includes a pigmented ink and an absorption or reflection type IR blocker.

Yet another aspect of the invention features a method of making an absorbent article including introducing a substrate as a component into an assembly process. The substrate as introduced carries both a discrete touch fastener secured to and covering a limited area of the substrate, and a radiation-inhibiting substance positioned between the touch fastener and the substrate and having an edge. The method includes positioning the substrate proximate an infrared radiation source and an infrared detector, irradiating the substrate with infrared radiation produced by the radiation source, and detecting the edge of the radiation-inhibiting substance based on infrared radiation received by the infrared detector, thereby determining a position of the substrate.

In some examples, the edge of the radiation-inhibiting substance is exposed beyond the touch fastener. In some applications, the radiation-inhibiting substance is exposed on two opposite sides of the touch fastener. In some implementations, the radiation-inhibiting substance is an ink printed on the substrate.

Yet another aspect of the invention features a touch fastener product with a flexible substrate having a surface characteristic that varies across the surface. The surface includes both a first region and a second region adjacent the first region. The surface characteristic varies to a greater degree within the second region than within the first region. An array of fastening projections extends from a resin layer, the resin layer having an edge disposed within, and adjacent an exposed portion of, the first region of the substrate surface.

In some applications, the resin layer defines a plurality of discrete flaps that are flexible out of a plane of the substrate under peel loads applied to a number of fastening projections carried by each of the flaps. In some examples, the discrete flaps are formed on an outer edge of the resin layer. In some implementations, the first region of the substrate comprises a discrete zone substantially surrounded by the second region. In some cases, the second region of the substrate surface is engageable by the fastening projections. In some embodiments, a first portion of the first region comprises a substantially flat surface and a second portion of the first region comprises a textured surface. In some examples, a tie layer of material bonded to the substrate defines the first region.

Yet another aspect of the invention features a touch fastener product with a flexible substrate carrying both a discrete touch fastener secured to and covering a limited area of the substrate, and a radiation-inhibiting substance positioned between the touch fastener and the substrate and having an edge. The radiation-inhibiting substance inhibits transmission of infrared radiation to a different degree than the substrate and the touch fastener.

In some applications, the edge of the radiation-inhibiting substance is exposed beyond the touch fastener. In some cases, the radiation-inhibiting substance is exposed on two opposite sides of the touch fastener. In some examples, the radiation-inhibiting substance is an ink printed on the substrate. In some implementations, the ink and the touch fastener are a similar color, as compared to the substrate surface.

Yet another aspect of the invention features a touch fastener product with a flexible substrate defining an open channel, the substrate having an average basis weight within the channel that is essentially equal to an average basis weight of the substrate in a region adjacent the channel, and an array of fastening projections extending from a resin layer. The resin layer is disposed within the channel such that a portion of the substrate surface adjacent the channel is exposed.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 14A is a schematic representation of a first method and apparatus for modifying a substrate surface.

FIG. 14B is a partial cross-sectional view of the unmodified substrate, taken along line 14B-14B in FIG. 14A.

FIG. 14C is a partial cross-sectional view of the modified substrate, taken along line 14C-14C in FIG. 14A.

FIG. 15A is a schematic representation of a second method and apparatus for modifying a substrate surface.

FIG. 15B is a partial cross-sectional view of the unmodified substrate, taken along line 15B-15B in FIG. 15A.

FIG. 15C is a partial cross-sectional view of the modified substrate, taken along line 15C-15C in FIG. 15A.

FIG. 17A is a schematic representation of another method and apparatus for making a laminated touch fastener.

FIG. 17B is a partial top view of a laminated touch fastener formed by the apparatus shown in FIG. 17A.

Like reference symbols in the various drawings indicate like elements.

DETAILED DESCRIPTION

Figure 1:
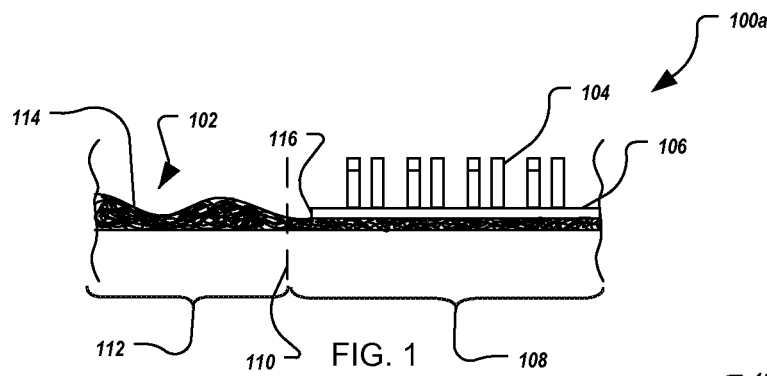
FIG. 1 is a partial transverse cross-sectional view of a first example laminated touch fastener.
Figure 2:
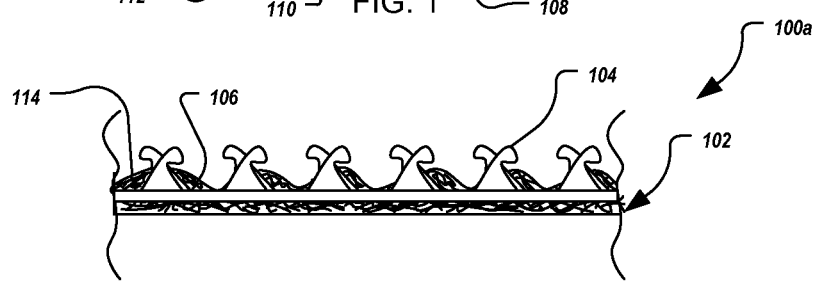
FIG. 2 is a partial side view of the touch fastener of FIG. 1.
Figure 3:
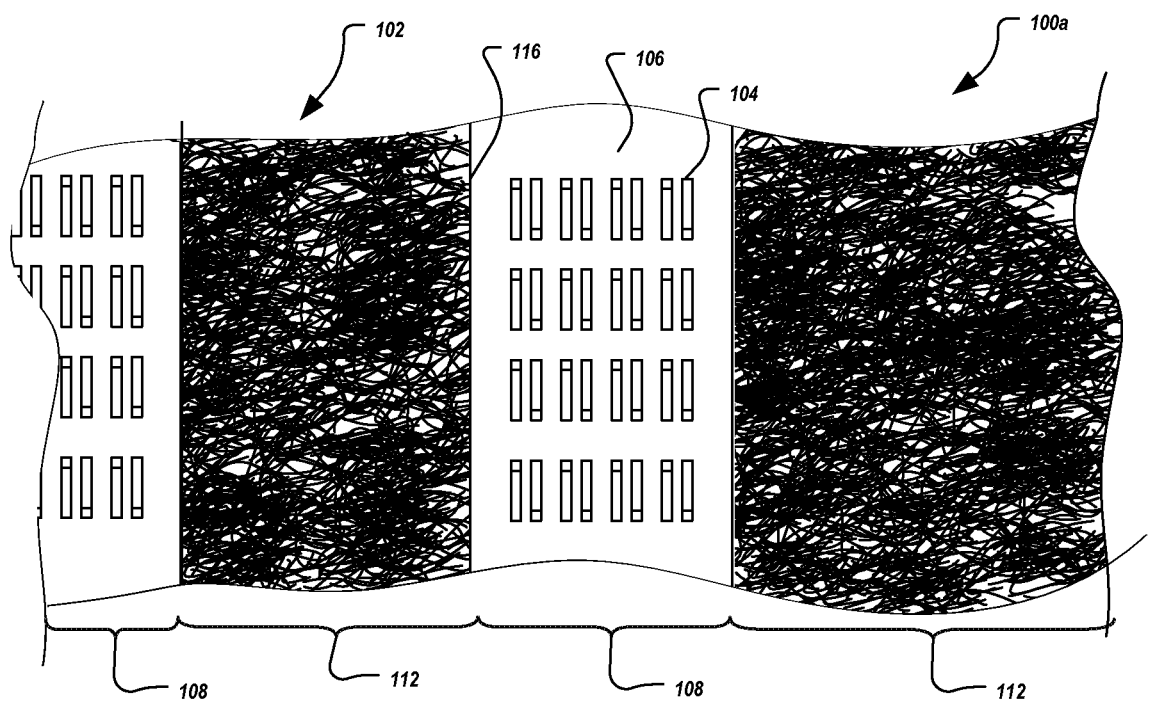
FIG. 3 is a partial top view of the touch fastener of FIG. 1.

Referring first to FIGS. 1-3, touch fastener 100a includes a flexible substrate 102 and a plurality of defined structures 104. Structures 104 extend from a solidified base layer 106 of flowable resin (e.g., polypropylene, polyethylene, or any other suitable resinous material) supported by the substrate surface within a first region of the substrate 108. A dividing line 110 represents a boundary between first region 108 and an adjacent second region 112. In this example, substrate 102 is a non-woven, fibrous web having one or more surface characteristics that vary across the substrate surface. Substrate 102 may be, for example, what is known in the non-woven industry as a staple fiber non-woven, a needle-punched non-woven, a spunbonded web such as a point un-bonded web, a spunbonded/meltdown/spunbonded (SMS) web, etc. Alternatively, substrate 102 may be a textile product such as a knit or woven product. In some implementations, the varying surface characteristic may be surface height, as discussed below. In some other implementations, the varying surface characteristic may be porosity, permeability, and/or density. In still other implementations, the varying surface characteristic may be reflectivity. Other comparable surface characteristics or suitable combinations of such surface characteristics may also vary across the surface of substrate 102. Surface characteristics within second region 112 vary to a greater degree than surface characteristics within first region 108. In this example, the greater degree of surface characteristic variability within second region 112 can be attributed to a plurality of three dimensional elements 114 (e.g., un-bonded portions of the fibrous web). Elements 114 provide topographic surface variations which define variations in the height of the substrate surface.

Figure 16A:
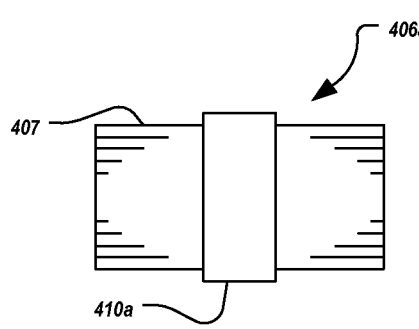
FIGS. 16A-16D are schematic side view representations of configurations of cylindrical tools for modifying the substrate surface in the method of FIG. 15A.
Figure 16B:
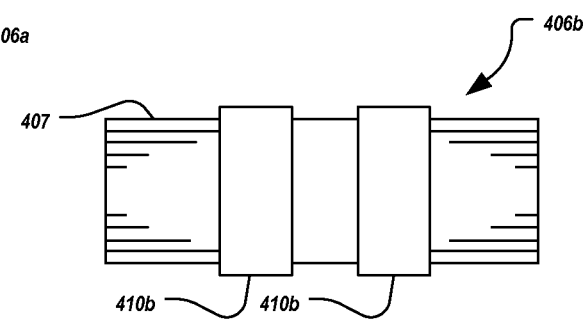
Figure 16C:
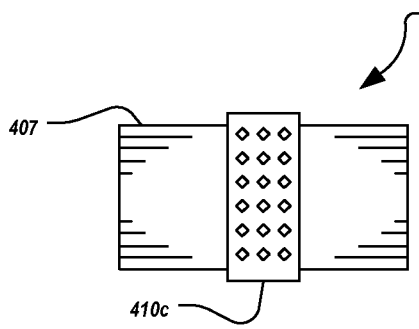
Figure 16D:
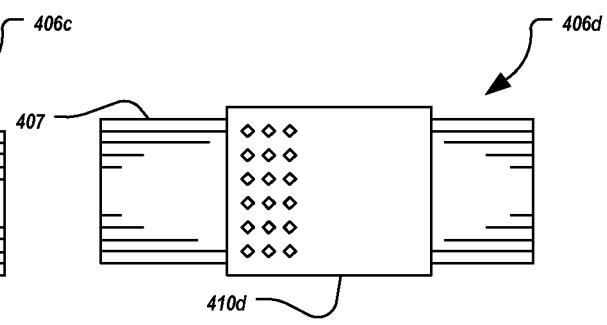

As described above, structures 104 extend from base layer 106. In this example, base layer 106 has a relatively straight edge 116 having little or no splay. Edge 116 is disposed on the substrate surface within first region 108 and adjacent an exposed portion of the first region, as discussed in greater detail below. As shown, structures 104 are formed as J-hooks defining a crook for snagging fibers of looped material. Structures 104, however, can be formed having other suitable shapes or sizes (see, for example, FIG. 5). Referring specifically to FIG. 3, structures 104 are positioned in a patterned configuration on base layers 106, and the base layers are deposited on substrate 102 in spaced parallel lanes. In some examples, the parallel lanes are approximately 15 millimeters wide, run down the length of substrate 102, and are positioned approximately 15 millimeters from the outboard edges of the substrate. Such configurations and arrangements may be especially advantageous in certain implementations (e.g., for forming precursor materials for making diaper tabs—see FIG. 16A). However, as discussed below, other suitable configurations or arrangements of base layers 106 and/or structures 104 are also envisioned (see FIG. 9, for example).

Figure 4:
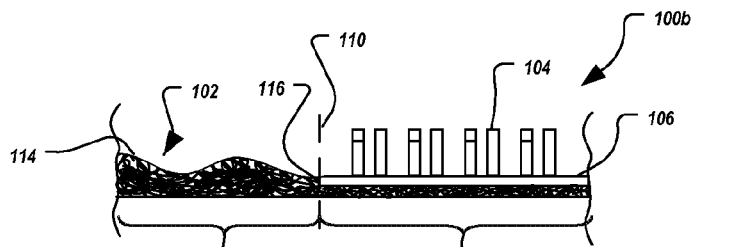
FIGS. 4-7 are partial transverse cross-sectional views showing other laminated touch fastener configurations.

Referring next to the laminated touch fastener 100b of FIG. 4, first region 108 is defined by an open channel or recess in the surface of substrate 102, in which the substrate thickness is substantially less than outside the channel or recess. Base layer 106 from which structures 104 extend is disposed within the channel such that edge 116 of the base layer abuts region boundary line 110 and is coincident with the channel edge. The opposite edge of the base layer is coincident with the opposite channel edge, such that the base layer is coextensive with the channel and therefore of the same width. The thickness of the base layer may approximate or equal the depth of the channel, for some applications.

Figure 5:
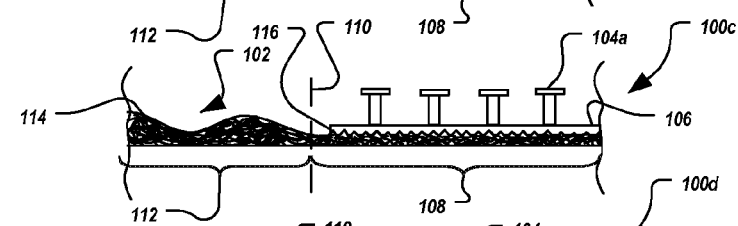

In the laminated touch fastener 100c shown in FIG. 5, the substrate surface within first region 108 is textured, as is the interface between the substrate surface and the base layer of resin. The textured surface of substrate 102 may enhance bonding of resin of the base layer 106 to the substrate. More specifically, a textured surface may provide more surface area than a flat surface, thereby increasing the number of potential bonding sites for the base layer to adhere to the substrate surface. Further, as shown, touch fastener 100c is provided with an alternate type of loop engageable structures. In this example, structures 104a are provided in the form of capped stems configured for snagging fibers. This type of fastening element is sometimes referred to as a mushroom-type fastening element. Other comparable fastening elements and suitable structures are also envisioned.

Figure 6:
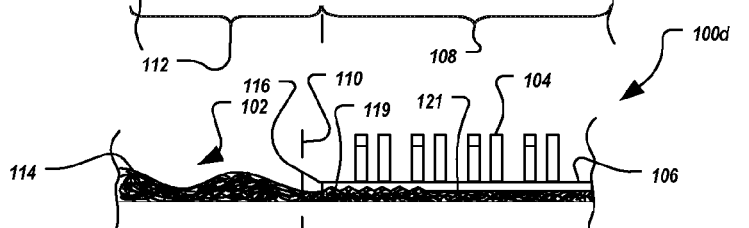
Figure 7:
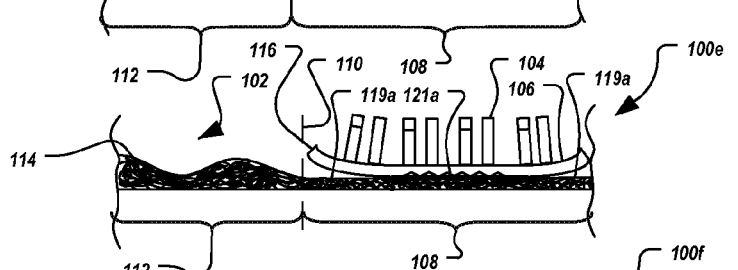

In the laminated touch fastener 100d of FIG. 6, an outer portion 119 of the substrate surface within first region 108 is textured and an adjacent inner portion 121 is left substantially flat (or un-textured). FIG. 7 shows a similar laminated touch faster 100e having a contrasting configuration within first region 108, in which inner portion 121a of the first region of the substrate surface is textured and outer portions 119a are left substantially flat where they underlie the edges of the base layer. As discussed above, base layer 106 may adhere or bond to the textured portions more readily than the flat portions. Further, as shown in FIG. 7, under some conditions base layer 106 may not bond to the flat portions of substrate 102 at all, or may lightly bond and later be detached while leaving the central portion of the base layer firmly bonded to the substrate. Such configurations can provide a non-uniform fastener peel performance profile across fasteners 100d and 100e. The configuration of FIG. 7 in particular provides what is sometimes referred to in the touch fastener industry as an 'anti-peel' property, in which the edge of the base layer flexes away from the substrate to translate a peel load applied from that edge into a shear load, thereby increasing the initial load required to separate the fastening Similarly, the middle section of fastener 100d where base layer 106 is not bonded to the substrate surface may provide a higher peel resistance than edge sections of the base layer that are more strongly bonded to the substrate.

Figure 8A:
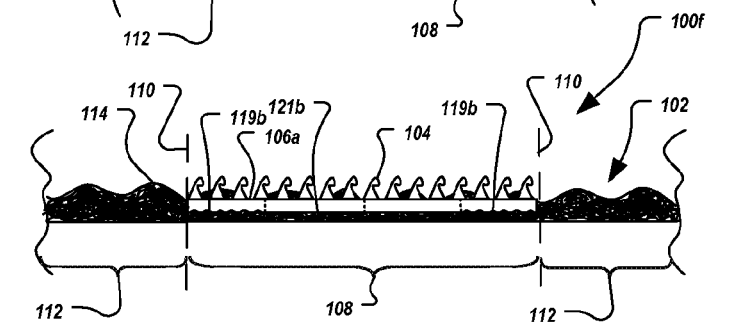
FIGS. 8A-8C are partial side, top, and perspective views of a laminated touch fastener having inner anti-peel flaps.
Figure 8B:
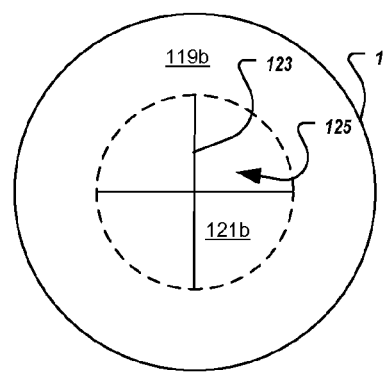
Figure 8C:
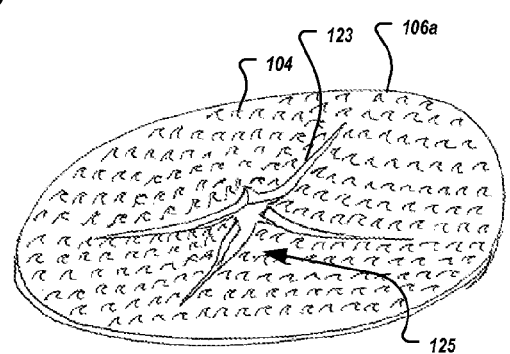

FIGS. 8A-8C provide another example of a laminated touch fastener 100f in which base layer 106a defines slits 123 that form discrete anti-peel flaps 125. In some implementations, slits 123 can be formed by die cutting through base layer 106a, but not through substrate 102. As shown in FIG. 8B (in which fastening structures are omitted for clarity), slits 123 extend outward in respective directions from a common point near the center of an inner region 121b, in which the substrate had been modified prior to lamination in order to reduce bonding of the base layer, towards the circumferential outer edge of the inner region. As discussed above, base layer 106a is more strongly bonded to annular region 119b where the substrate was not modified before lamination, than in inner region 121b. As a result, flaps 125 can be detached and bent out of the plane of substrate 102 by fastening forces (as shown in FIG. 8C), thus increasing the effective peel resistance of touch fastener 100f.

Figure 9A:
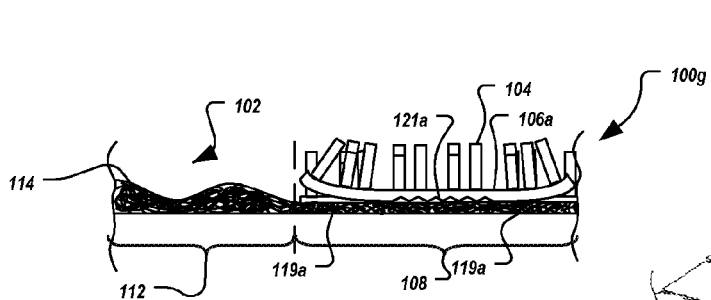
FIGS. 9A and 9B are partial transverse cross-sectional and perspective views of a laminated touch fastener having segmented outer anti-peel flaps.
Figure 9B:
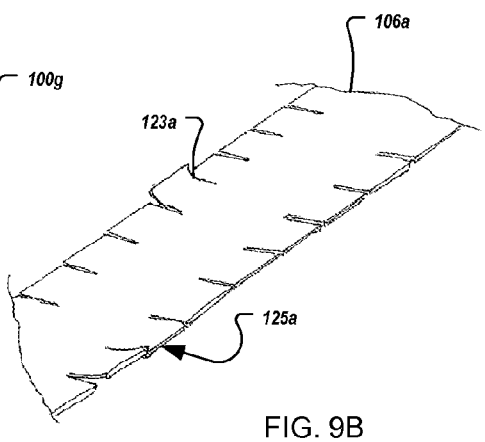

FIGS. 9A and 9B illustrate yet another example of a laminated touch fastener 100g where substrate 102 is provided in a similar configuration as shown in FIG. 7. That is, in this example, inner portion 121a of the first region of the substrate surface is textured and outer portions 119a are left substantially flat where they underlie the edges of the base layer. The difference between this example and that of FIG. 7 is that base layer 106a defines slits 123a that bound discrete edge flaps 125a. As shown in FIG. 9B (in which fastening structures are omitted for clarity), slits 123a extend inward from the lateral edges of the base layer across the modified region 119a of the substrate surface. As such, flaps 125a overlay substantially flat outer portions 119a and may be less bonded, or not bonded at all, to substrate 102. Therefore, flaps 125a can be bent out of the plane of substrate 102 when pulled, increasing the effective peel resistance of touch fastener 100g. Although FIGS. 8A-9C provide suitable examples of laminated touch fasteners having anti-peel flaps. Various other arrangements are also envisioned. For example, in some implementations, discrete anti-peel flaps can be formed along the center of base layer 106a (with the edges of the base layer being firmly bonded to substrate 102), or forming around the perimeter of base layer 106a (with the center of the base layer being firmly bonded to substrate 102).

In the laminated touch fastener 100h of FIG. 8, a tie layer of material 120 is disposed on and bonded to the surface of a woven substrate 102a. The tie layer may fill in the areas between three-dimensional elements 115A, thereby providing an area within first region 108 of reduced topographic surface variations (and thus, an area having a surface characteristic that varies less than in second region 112). Base layer 106 is bonded to tie layer 120 such that edge 116 of the base layer is adjacent an exposed portion of the tie layer. The edge 116 of the base layer thereby is spaced from the surface of the substrate, and a more controlled edge may be readily obtained. In some examples, tie layer 120 is formed of a material to which base layer 106 readily adheres, or more readily adheres than to the substrate surface. The tie layer may be of a material, for example, selected for its bonding compatibility with both the substrate surface material and the base resin.

Figure 11:
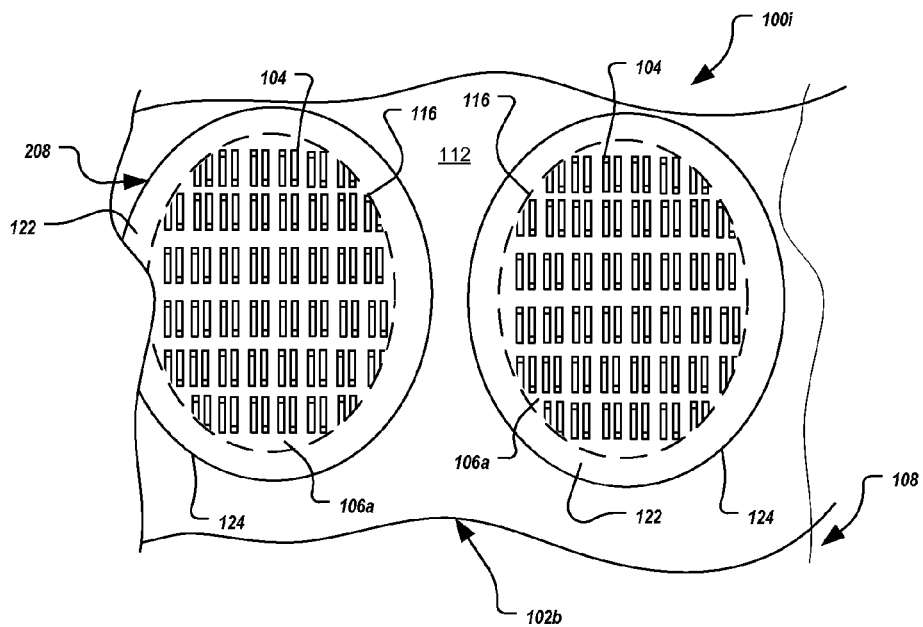
FIG. 11 is a partial top view of a laminated touch fastener having circumferentially bounded fastening areas bonded to an ink layer.

In the laminated touch fastener 100i of FIG. 11, a layer of ink 122 is carried by the surface of substrate 102b, within first region 108. As shown, a circumferential, continuous edge 124 of ink layer 122 forms a curved boundary on the substrate surface. Substrate 102b is formed of a material which readily receives ink media (e.g., a paper or non-woven product). Base layer 106 is bonded to the substrate surface within the boundary of ink layer 122, such that the circumferential edge of the base layer overlays the ink layer and is spaced from the ink-free region of the substrate. In some cases, ink layer 122 has a color selected to match or approximate the color of base layer 106, to help to mask edge variations of the base layer and provide the appearance of a clean resin edge. That is, a consumer of touch fastener 100g may not be able to easily discern a splayed edge 116 of base layer 106 from the clean edge 124 of ink layer 122. Although in this example, ink layer 122 is deposited on substrate 102b in discrete island-like formations, other suitable arrangements are also possible. For example, ink layer 122 can be deposited on the surface of substrate 102b in continuous lanes running across the length or width of the substrate.

In some implementations, ink layer 122 can include a number of additives to produce a desired effect. For example, ink layer 122 can include a pigment to achieve a specific color (for example, a color matching the color base layer 106, as describe above). Additives can also be used promote or inhibit bonding with substrate 102b and/or base layer 106. In some examples, additives such as infrared red (IR) blockers (e.g., absorbent or reflective IR blockers) can be incorporated into ink layer 122. IR blockers may cause ink layer 122 to inhibit transmission of IR radiation to a different degree than substrate 102b. For example, the IR blockers may inhibit transmission of IR radiation having a wavelength between about 600 nanometers and 1200 nanometers. As a result, an IR detection system can be used to detect an edge of ink layer 122. As described in U.S. Pat. No. 7,935,296, the entirety of which is incorporated herein by reference, IR detection of an edge can be especially advantageous in determining whether one or more components of a composite article (e.g., disposable absorbent products) are properly positioned.

Figure 12:
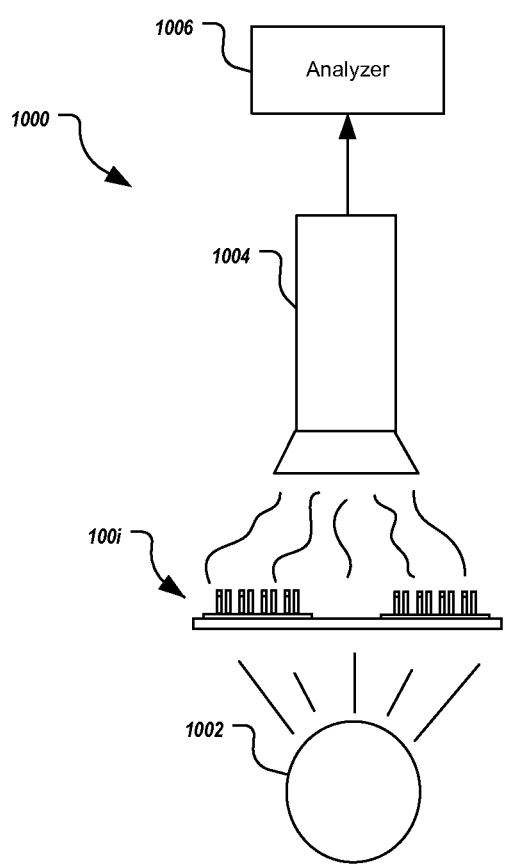
FIG. 12 is a block diagram of an IR detection system for detecting an edge of a laminated touch fastener.

Referring to FIG. 12, in this example, a detection system 1000 includes an IR radiation source 1002, an IR detector 1004, and an analyzer 1006. As shown, a composite article, such as touch fastener 100i (described above with ink layer 122 including IR blockers) can be placed near IR radiation source 1002 and IR detector 1004. IR radiation source 1002 irradiates touch fastener 100i with IR radiation and IR detector 1004 receives radiation transmitted through the touch fastener. In this example, IR detector 1004 can produce an image based on the contrast in the IR radiation received. For example, more IR radiation may be transmitted through ink layer 122 than through substrate 102b. Analyzer 1006, which is operatively connected to IR detector 1004, can analyze the image to identify an edge of ink layer 122.

Figure 13:
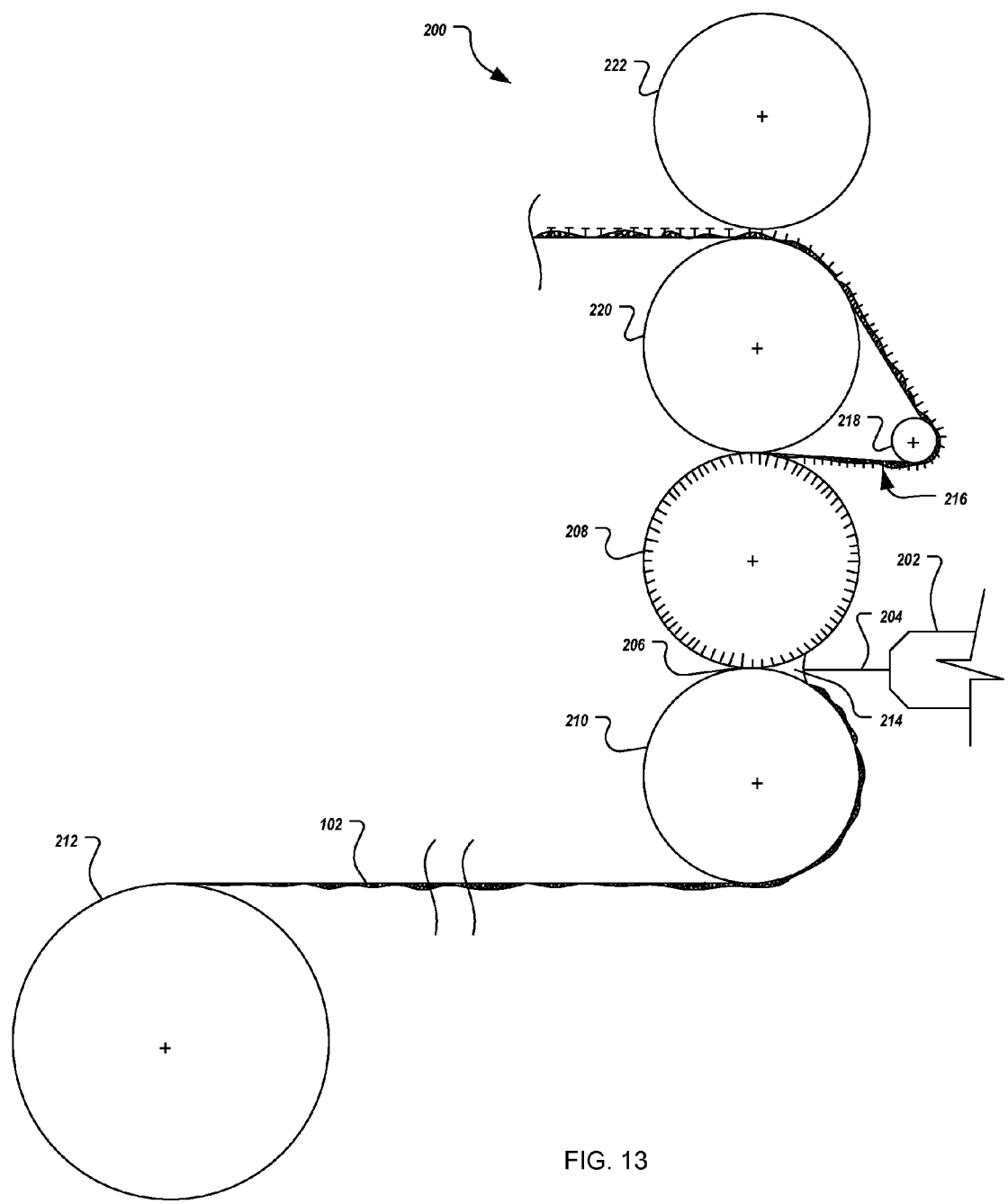
FIG. 13 is a schematic representation of a first method and apparatus for making a laminated touch fastener.

Referring next to FIG. 13, apparatus 200 includes an extruder 202 continuously providing molten resinous material 204 to a nip 206 between a cavity roller 208 (which may be cooled to promote solidifying of resinous material 204) and a base roller 210. At the same time, substrate 102 is carried into nip 206 by base roller 210. Extruder 202 only provides resinous material 204 to certain width-wise regions of nip 206 that are aligned with resin application regions (e.g., first regions 108 of FIG. 3) of substrate 102. In this way, one or more continuous lanes of hook engageable structures can be formed on substrate 102 on base layers within the resin application regions and with edges near or abutting boundaries of the resin application regions, as described above (see FIGS. 1-3, for example).

Base roller 210 may be configured to provide substrate 102 to nip 206 in a substantially smooth, unwrinkled state such that the substrate forms an even laminate backing for the resulting fastener product. For example, base roller 210 may be provided with a plurality of pins arranged on its periphery for carrying substrate 102; other suitable methods or structures may also be used (e.g., a coated or chemically treated non-slip surface, etc.). In this example, substrate 102 is introduced from a stock roll mounted on a let-off device 212. In some implementations, a straightening device and/or an arrangement of tensioning rollers may be used to ensure that substrate 102 is provided to base roller 210 in proper alignment and condition.

Resinous material 204 (e.g., molten thermoplastic resin) provided by extruder 202 pools in a supply bank 214 which is pulled into nip 206. Under pressure in nip 206 resinous material 204 may be forced into the mold cavities of cavity roller 208 and into any pores in substrate 102. In this way, a base layer of resinous material 204 intimately adheres or bonds to substrate 102, perhaps encapsulating fibers or other surface features of the substrate. As described in U.S. Pat. No. 5,260,015, the entirety of which is incorporated herein by reference, penetration of resinous material 204 into pores of substrate 102 can be a function of a number of variables. For example, penetration may depend on the thickness or porosity of substrate 102, the viscosity of molten resinous material 204, the material temperatures and/or the pressure maintained (e.g., via hydraulics) in nip 206.

In this example, a resulting continuous laminated touch fastener product 216 (i.e., substrate 102 having resinous material 204 laminated thereto) is separated from cavity roller 208 by a stripping roller 218. Touch fastener 216 is then optionally passed through a nip between a wrap-around roller 220 and a calender roll 222 while the resinous structures (in this example, stems) are soft and readily deformable. Calender roll 222 caps the stems by heated contact under nip pressure, permanently deforming resin of the distal ends of the stems, to form engageable heads. In some other examples, calender roll 222 simply helps to knock down distended or taller resinous structures (e.g., hooks) to a uniform, desired height. The ends of the molded elements (such as stems) may be reheated just prior to engagement by calendar roll 222, such as by a flame treatment. Such a treatment is described, for example, in U.S. Pat. No. 6,248,276, the entire contents of which are hereby incorporated by reference.

Figure 10:
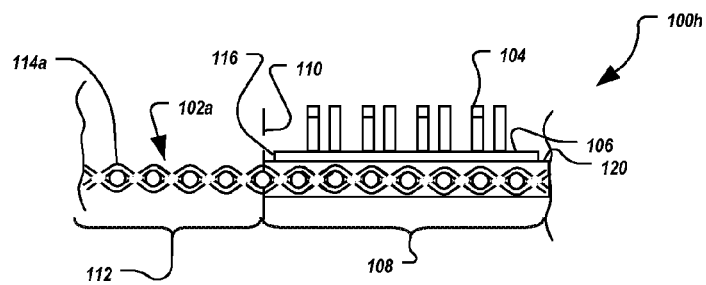
FIG. 10 is a partial transverse cross-sectional view of a laminated touch fastener including a woven substrate.

Although FIG. 10 provides an exemplary apparatus for forming a laminated fastener, various other apparatus are also envisioned. For example, a forming nip for receiving the resinous material and substrate under pressure can be formed between the curved surface of a cavity roller and a complementary injection die. Such an apparatus is described in U.S. Pat. No. 5,669,120, the entire contents of which are hereby incorporated by reference.

The surface of the substrate can be modified prior to introducing the resin from which the structures are molded. This modification creates a resin application region on which such resin can be laminated and molded with an edge having little or no visible splay (see FIGS. 1-7, for example). Such modifications may be performed separately or on the same manufacturing line as the process described above.

For example, in FIG. 14A apparatus 300 modifies the upper surface of a substrate 302 having varying surface characteristics. Prior to modification (FIG. 14B), the upper substrate surface has an undulating surface topography in which the elevation of the upper surface varies both in the longitudinal and transverse directions. After modification (FIG. 14C), a modifying layer applied to the surface in the resin application regions modifies that characteristic by covering the undulations and providing a flatter upper surface. In this example, parallel tie layers of molten material 304 are deposited onto the substrate surface by an extruder 306 or other suitable deposition method. Tie layers 304 are carried by substrate 302 to a nip 308 between a pair of calender rolls 310 and 312. The narrow space of nip 308 may be maintained at a relatively low pressure such that the tie layer bonds to the substrate surface without inducing excessive splay at the edges of the resin lanes. Alternatively, when particularly porous substrates are used, tie layers 304 may be deposited on the substrate surface without any subsequent pressure. In such cases, the porosity of the substrate may be sufficient to allow the molten tie layer material to penetrate the substrate surface under atmospheric pressure alone. Further, in some other cases, the tie layer material may form a chemical bond with the substrate surface, thereby obviating any need for calender rolls 310 and 312. In any case, as shown in FIG. 14C, the modification results in a substrate surface having resin application regions 316 differing from other regions of substrate 302. In this manner, resin application regions 316 are provided with at least one surface characteristic that varies to a lesser degree than in adjacent surface regions. In some cases, the surface characteristics of resin application regions 316 may be substantially uniform across those regions. In an alternate arrangement, extruder 306 is controlled to deliver discrete pulses of resin to the substrate, so as to form longitudinally discontinuous islands of resin or spaced-apart bands of resin running across the substrate.

Referring next to FIGS. 15A-15C, apparatus 400 modifies the surface of substrate 402 by crushing or flattening the substrate in desired regions, without the addition of any further material. In this example, substrate 402 is introduced to a nip 404 between a pair of calender rolls 406 and 408. Calender roll 406 includes an outer ring 410 creating an uneven profile across nip 404, such that in some places the nip is narrower than in adjacent regions of the nip. Thus, when substrate 402 passes through nip 404, portions of the substrate engaged by ring 410 are compressed or flattened more than in adjacent regions of the substrate, which may remain substantially unmodified (as shown in FIG. 15C). Thus, the resulting substrate 402 includes a resin application region 412 differing from other regions of the substrate, while maintaining a substantially uniform basis weight across the substrate. As a result, resin application region 412 has surface characteristics that vary to a lesser degree than the surface characteristics of other adjacent surface regions.

FIGS. 16A-16D show various roll configurations for modifying the surface of the substrate. For example, calender roll 406a of FIG. 16A includes a cylindrical body 407 supporting a concentric outer ring 410a positioned at or near an axial centerline of the body. In a second example, shown in FIG. 16B, calender roll 406b includes cylindrical body 407 supporting matching outer rings 410b. Outer rings 410b are concentric with cylindrical body 407 and positioned at a selected axial position and distance from each other. In this example, outer rings 410b are spaced an equal distance from the axial centerline to modify the substrate in only two, spaced apart regions. In a third example, shown in FIG. 16C, calender roll 406c is provided in a similar configuration as calender roll 406a. In this example, however, outer ring 410c includes an embossing pattern for texturing the substrate surface, as described above (see FIG. 5, for example). In a fourth example, shown in FIG. 16D, calender roll 406d is provided in an outer ring 410d that includes a first section having an embossing pattern and a second section free of the embossing pattern. In this way, one section of the modified resin application region of the substrate will be impressed with the embossments, while another portion will be modified without embossing (see FIGS. 6 and 7, for example).

In other configurations, the rolls are configured to modify the substrate, such as by crushing, only in longitudinally spaced-apart regions, such as bands or spots.

Apparatus 500 of FIG. 17A functions in a similar fashion as apparatus 200, described above (see FIG. 13). For instance, as shown, a substrate 501 is fed from a stock roll mounted on a let-off device 512. In due course, substrate 501 is carried by base roller 510 into a nip 506 formed between the base roller and a cavity roller 508. Molten resinous material 504 is provided to nip 506 simultaneously with substrate 501 by an extruder 502. Resinous material 504 is pulled into nip 506 and forced into the mold cavities of cavity roller 508, as well as any pores in substrate 501. The molten resinous material inside the mold cavities hardens (to at least some degree) to form defined structures (in this case stems) as cavity roller 508 carries the material and substrate 501 on its periphery. The resulting product is separated from cavity roller 508 by a stripping roller 518, and passed between a wrap-around roller 520 and a calender roll 522 to cap the recently formed stems.

In this example, substrate 501 is modified prior to its introduction to nip 506. More specifically, a layer of ink 524 is applied to the surface of substrate 501 via ink jet 526 or some other suitable ink application method, and the substrate is exposed to heater 528 to promote drying of the ink. Any suitable ink may be used to form ink layer 524. For instance, in this example, a wax based ink was used. The resulting modified substrate with its resin application region (corresponding to ink 524) formed on its surface is introduced to nip 506, in which resinous material 504 is only applied within the resin application region of substrate 501, over the ink layer.

FIG. 17B is a top view of a portion of the upper surface of a laminated touch fastener 516 formed on the apparatus of FIG. 17A. As shown, the splayed edges 529 of resin base layer 530, from which structures 532 extend, is disposed within the width of the ink 524. Preferably, ink 524 is of a color selected to approximate that of resinous material 504, which will define edges that are less splayed than the resin edges, so as to reduce the visual effect of the splayed edges 529 of the resin. In this way, a more appealing, defined edge is presented to consumers. Consumers may also perceive a softer edge due to the absence of structures at the periphery of the resin application region.

Figure 18A:
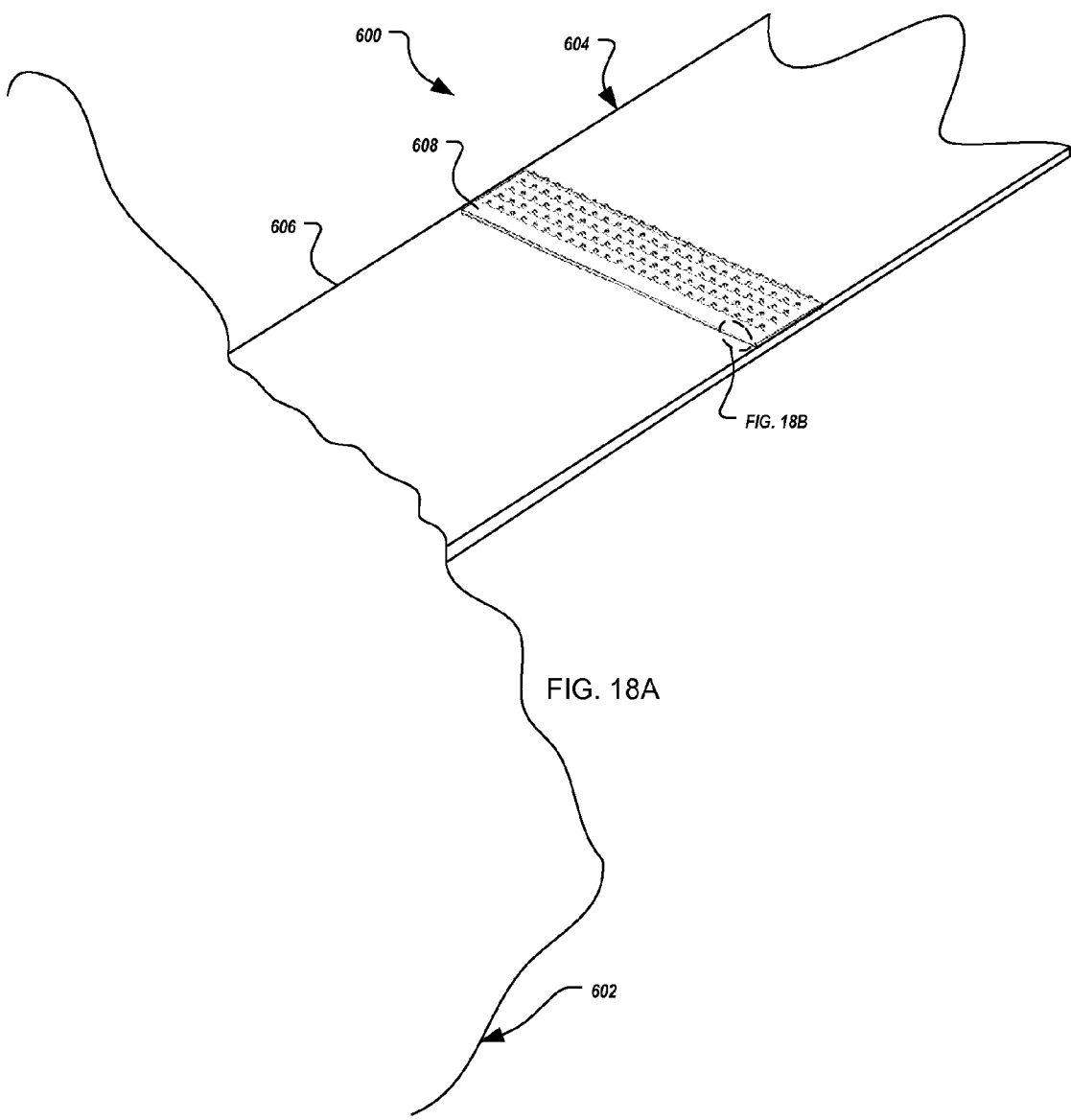
FIG. 18A is a perspective view of a diaper tab implementation of a laminated touch fastener.
Figure 18B:
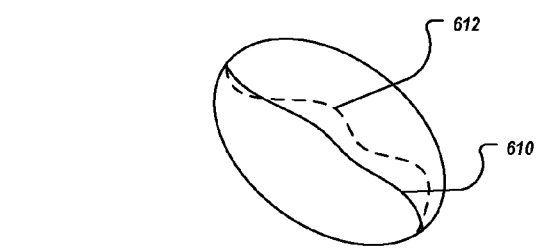
FIG. 18B is an enlarged view of area 18B in FIG. 18A.

Referring next to FIG. 18A, diaper 600 including a diaper chassis 602 (for clarity, the diaper chassis is not shown in detail or in its entirety) and a diaper tab 604 extending from the chassis and featuring a lane of loop-engageable structures. More specifically, diaper tab 604 includes a substrate 606 (such as a stretchable non-woven material with a varying surface characteristic) having a base layer of resinous material 608 laminated to its surface in a modified region of reduced surface characteristic variation. Loop engageable structures (e.g., capped stems or hooks) extend from base layer 608. Diaper tab 604 can be made according to any method or system described above. As illustrated in the enlarged view of FIG. 18B, the variation of edge 610 is significantly less than it would have been had the region where the resin was laminated not have been modified (indicated for purposes of illustration as dashed line 612).

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of making a laminated touch fastener, the method comprising:
    introducing a flexible substrate to a resin applicator;
    applying flowable resin to a limited region of a surface of the substrate: and
    molding the applied resin to form a plurality of defined structures extending from a layer of the applied resin,
    wherein the substrate surface, as the substrate is introduced to the resin applicator, has a surface characteristic that varies across the surface, the surface comprising both a first region and a second region adjacent the first region, the surface characteristic, varying to a greater degree within the second region then within the first region,
    wherein the flowable resin is applied within the first region, and
    wherein the resin is applied such that an edge of the resin layer is disposed within, and adjacent an exposed portion of, the first region of the substrate surface.

2. The method of claim 1, further comprising, prior to introducing the substrate to the resin applicator, modifying the substrate to form the first and second regions.

3. The method of claim 2, wherein modifying the substrate comprises modifying a portion of the substrate surface and leaving another adjacent portion of the surface substantially unmodified, the modified portion of the surface defining the first region and the unmodified portion of the surface defining the second region.

4. The method of claim 3, wherein modifying the substrate surface comprises substantially flattening three-dimensional features of the substrate surface.

5. The method of claim 3, wherein modifying the substrate surface comprises applying pressure to the substrate.

6. The method of claim 5, wherein applying pressure to the substrate comprises introducing the substrate to a nip between calender rolls.

7. The method of claim 3, wherein modifying the substrate surface comprises bonding a tie layer of material to the surface.

8. The method of claim 3, wherein modifying the substrate surface comprises texturing the surface.

9. The method of claim 1, further comprising affixing the resin layer to the substrate surface within the limited region such that a first portion of the resin layer is more securely fixed to the substrate surface than a second adjacent portion of the resin layer.

10. The method of claim 9, further comprising forming a plurality of slits in the second portion of the resin layer, to form discrete flaps that are flexible outward from the substrate surface.

11. The method of claim 3, wherein modifying the substrate surface comprises applying a layer of ink to the surface.

12. The method of claim 11, wherein the layer of ink reflects infrared radiation to a different degree than the substrate surface in a region adjacent the layer of ink, such that an edge of the layer of ink, as applied, is detectable by an infrared detection system.

13. The method of claim 1, wherein the surface characteristic comprises porosity.

14. The method of claim 1, wherein the surface characteristic comprises surface height variability.

15. The method of claim 1, wherein the second region of the substrate surface, as the substrate is introduced to the resin applicator, is hook engageable.

16. The method of claim 1, wherein the second region of the substrate surface, as the substrate is introduced to the resin applicator, comprises a regularly patterned plurality of discrete three dimensional features.

17. The method of claim 1, wherein forming the plurality of structures also comprises forming hooks, the outer surface of each of the hooks defining a crook for loop engagement.

18. The method of claim 1, wherein the first region of the substrate surface, as the substrate is introduced to the resin applicator, is a discrete zone substantially surrounded by the second region.

* * * * *